May 9, 1967 R. S. WEBB 3,318,793
SERVO FEED APPARATUS FOR ELECTRICAL DISCHARGE MACHINING
Filed Nov. 2, 1962 3 Sheets-Sheet 3
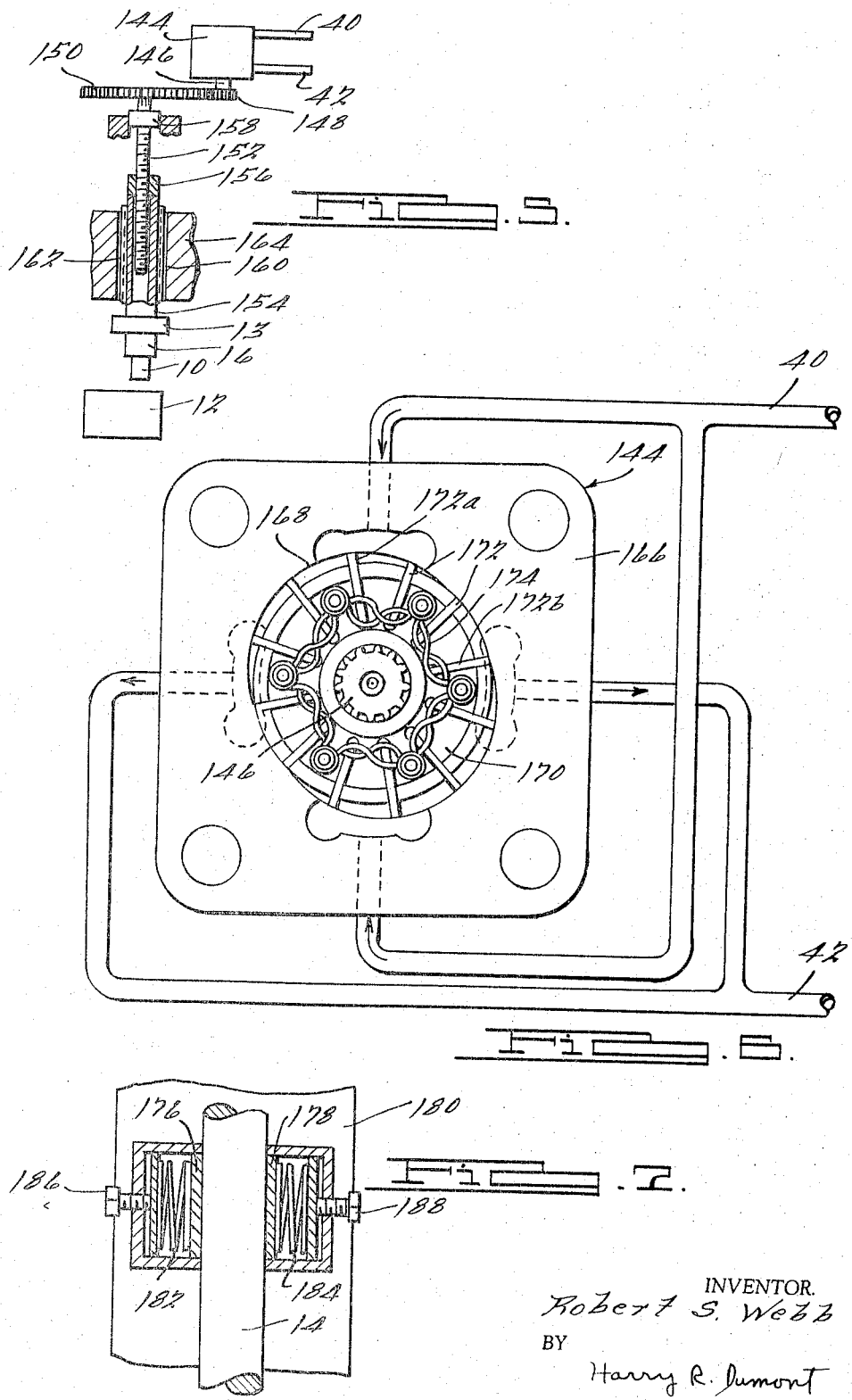
INVENTOR.
Robert S. Webb
BY
Harry R. Dumont
ATTORNEY.

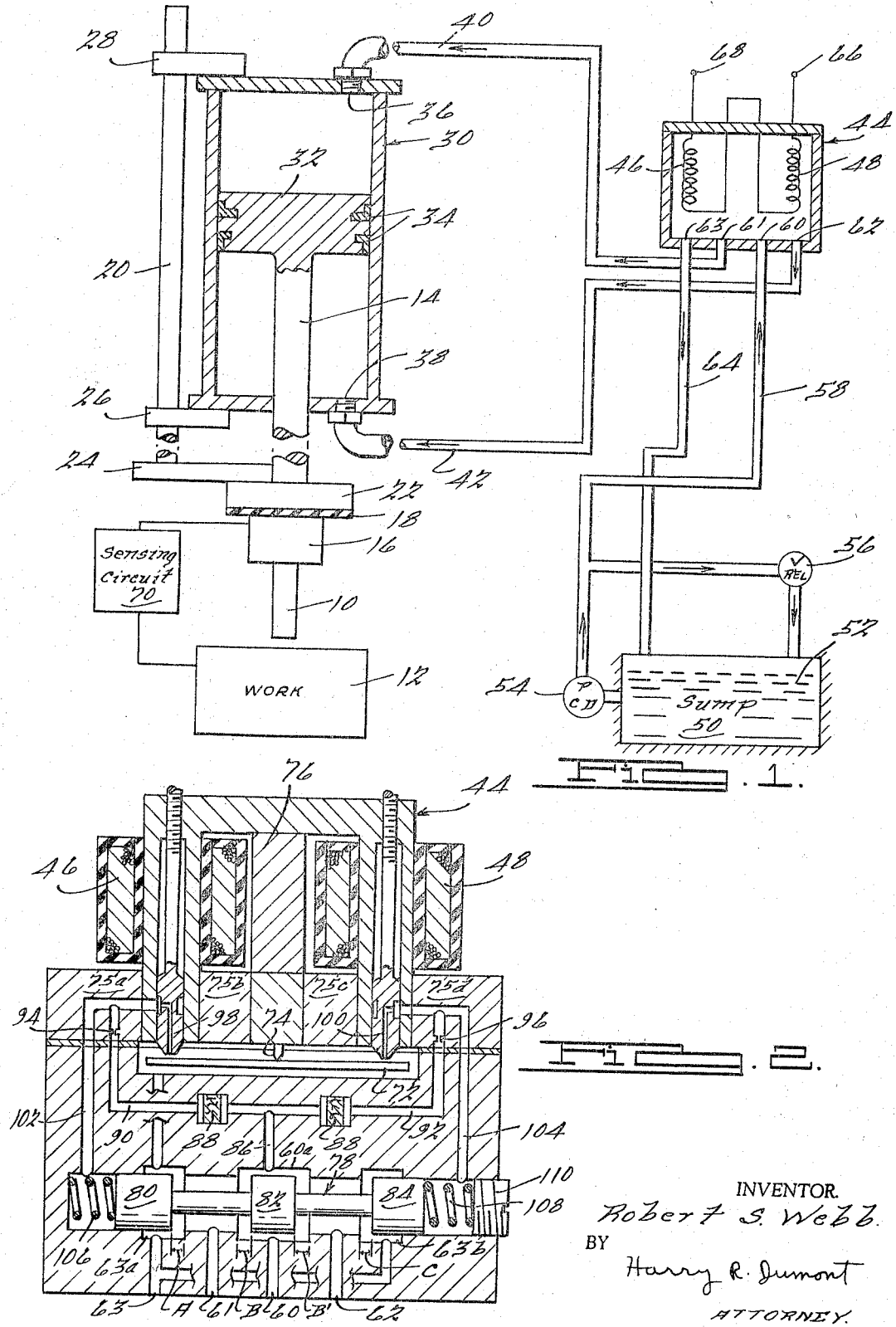

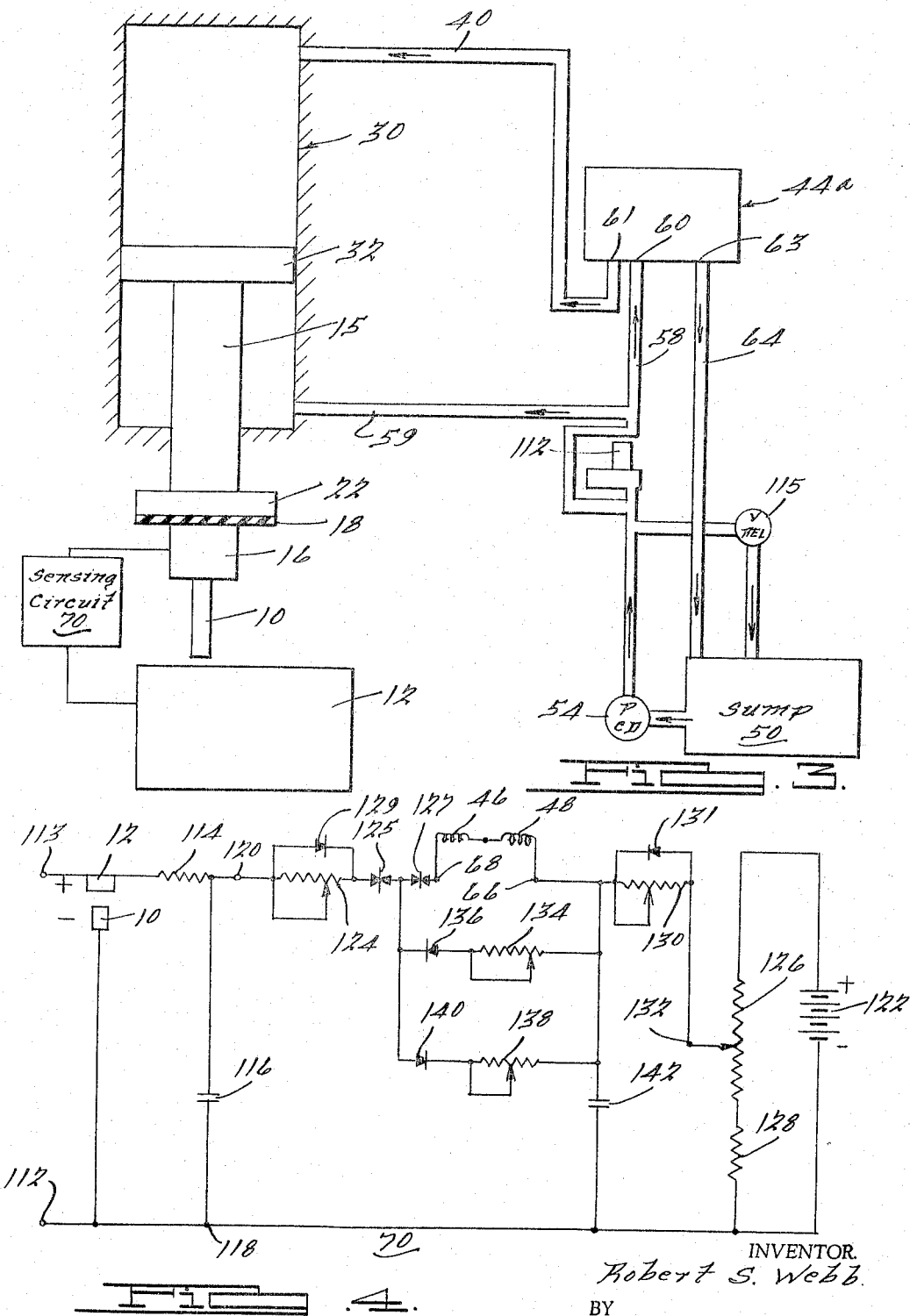

United States Patent Office 3,318,793
Patented May 9, 1967

3,318,793
SERVO FEED APPARATUS FOR ELECTRICAL
DISCHARGE MACHINING
Robert S. Webb, Bloomfield Hills, Mich.
(1830 Stephenson Highway, Troy, Mich. 48084)
Filed Nov. 2, 1962, Ser. No. 235,053
7 Claims. (Cl. 204—225)

This invention relates generally to fluid actuator systems and to fluid actuator systems utilized in servo feed apparatus for electrical machining and electrical discharge machining, in particular.

Electrical machining or EM refers to the general field of machining in which electricity is applied directly for the actual eroding of a shape in a conductive workpiece. Examples of electrical machining are electrical discharge machining, electrochemical machining, electrolytic grinding, electron beam machining, arc cutting and electropolishing.

Electrical discharge machining, sometimes referred to in the art as EDM, spark machining, or arc machining is carried on by passing a series of discrete, localized, extremely high current density discharges across a gap between a tool electrode and a conductive workpiece at sonic or ultrasonic frequencies in the presence of a dielectric fluid for eroding the workpiece.

Fluid actuated servo feed systems have certain basic advantages over servo feed systems of the mechanical or electromechanical type. Among these advantages are greater speed of response, much greater output forces, and lower control power requirements. One example of such a fluid actuated servo feed system which has been utilized in the EDM art is to be found in my U.S. Patent No. 2,984,761, "Hydraulic Servo Feed," issued on May 16, 1961, and of common ownership herewith.

The outstanding disadvantage of fluid actuated servo feed systems is their instability at null or static conditions. This instability results in drift or mechanical motion in the output of the system. During setup of a precise machining operation, it is necessary for the element which is normally servo fed to be set in a stationary position. This stationary position is required for mechanical setup and correct alignment of parts and tools and for setting of the various feed limit stops required for precision control of the operation. Mechanical movement of the output at this time makes it impossible to achieve proper setup. Furthermore, during the servo control operation it is generally desirable to have three clear-cut conditions of motion; advance, null or stationary condition, and retraction. Instability about null makes it virtually impossible to set up a system for clear-cut operation in these three distinct movements. Conditions contributing to unbalance at the null condition include temperature drift of the hydraulic system, changes in operating pressure, deadband or hysteresis within the servo valve, changing static friction characteristics of the system, different static loads for different size and weight of fixtures and tooling, and different dynamic loads resulting from tool force or, in electrical discharge machining, from coolant force between the electrode and workpiece. Other factors contributing to change in null characteristics of the system are varying leakage past the piston in the cylinder actuated system and dirt or contamination within the system becoming lodged in a critical port of the servo valve or within hydraulic seals within the piston or other moving parts of the system.

Another outstanding disadvantage in the use of fluid actuated servo feed systems is that they have an inherent backlash characteristic. The presence of this backlash characteristic in electrical discharge machining, as in any precise machining operation, presents a particularly serious problem. For example, where the operation is of the finishing type, the approximate maximum feed rate of 30 inches per minute frequently falls to about .000001 inch per minute. When the electrode approaches the workpiece, the actual machining may begin in response to a sensing circuit at the optimum gap at about .003 inch. The servo must establish a null condition and, thereafter, feed at a very slow rate. It will be seen that, if there is appreciable backlash in the system, the electrode will overrun the optimum gap distance and backup will result. Upon backup, the backlash will cause overrun in the opposite direction and a continuous hunting action may set up which is deleterious to the stable operation of the electrical discharge machining apparatus.

The prime object of my invention is to overcome operating deficiencies of the above-described type which may occur in electro-hydraulic servo feed systems, to improve their stability of operation and, yet retain their characteristic advantages.

It is an additional object of my invention to provide an improved, hydraulically actuated, servo feed system in which a predetermined threshold of operation of the hydraulically actuated motor may be precisely determined.

It is another object of my invention to provide a fluid actuator system which has null stability of operation approaching that of a mechanical system, which object is obtained by the joint employment of fluid biasing means and means for varying the static friction of the system.

It is a further object of my invention to provide an improved, hydraulically actuated, servo feed system in which the null position of the motive element of the hydraulically actuated system may be selectively varied by simple and readily adjustable fluid control means integral with a directional control valve utilized in the system.

It is a further object of my invention to provide an improved servo feed system particularly effective in precise positioning of a tool relative to a workpiece as required in the operation of precision machine tools such as electrical discharge machining apparatus.

It is a further object of my invention to provide an improved servo feed system for use in connection with electrical discharge machining apparatus in which a stabilized electrical control is maintained responsive to gap voltage.

It is a still further object of my invention to provide an improved electro-hydraulic servo feed system for use in connection with electrical discharge machining apparatus in which the servo system is electrically, mechanically, and hydraulically stabilized in its operation.

The foregoing objects and still others, together with the advantages of the present invention, will become apparent upon consideration of the accompanying drawings in which:

FIGURE 1 is a schematic view of an electro-hydraulic servo feed system constructed in accordance with my invention employing a cylinder shown in vertical section to disclose the detail of its construction;

FIGURE 2 is a detail, sectional view on an enlarged scale of the directional control valve utilized in the hydraulic servo feed system of FIGURE 1;

FIGURE 3 is an alternate embodiment of the invention as shown in FIGURE 1 further distinguished by the incorporation of a directional control valve of the three-way or single control port operating type;

FIGURE 4 is a schematic diagram showing the sensing circuit which is responsive to an electrical characteristic of the gap and controls operation of the directional control valve;

FIGURE 5 is a diagrammatic view of an alternate system utilizing the present invention in connection with a hydraulic motor of the rotary type;

FIGURE 6 is an elevational view, with end plate removed, of the rotary type hydraulic motor of FIGURE 5; and FIGURE 7 is a sectional view of a means for applying a selectively controlled static friction which may be utilized in hte systems of FIGURES 1 and 3.

With reference to FIGURE 1, it will be seen that I have shown a fluid actuator system herein embodied as a power feed system for an electrode 10 which is intended to be fed toward a workpiece 12 for machining the same by intermittent electrical discharge. It will be understood that a dielectric fluid is usually maintained in the gap provided between electrode and workpiece in electrical discharge machining. It will further be apparent that, while the present invention is described as showing a hydraulic servo system for moving an electrode with reference to a stationary workpiece, it may as readily be applied to a hydraulic servo system in which the electrode is maintained stationary and the workpiece is moved toward and away from the electrode with a simple reversal of parts and motion. Electrode 10 is mounted to be fed into workpiece 12 and secured to a piston rod 14 by a suitable holder 16 which is electrically insulated from the rod by an insulating member 18. A guide bar 20 is secured to a platen 22 by support 24 and therefore is carried by the motion of rod 14. Guide blocks 26 and 28 are mounted at opposite ends of a cylinder 30 to provide an external arrangement to prevent the rotation of rod 14. It is understood that this guide bar arrangement may be replaced by a ram and V-way construction well known in the machine tool field. The rod 14 is carried by a power feed piston 32 disposed and differentially positionable in cylinder 30. Piston 32 is provided with peripheral seals 34 of a suitable resilient material. Fluid inlet-outlet ports 36, 38 are disposed in the respective cylinder heads, these ports being connected through conduits 40, 42 to a directional control valve 44 of the four-way type, that is, having four conduit connections; one from the pressure source, a second to the reservoir or sump, and the other two control lines connected, respectively, to each end of the work cylinder. Directional control valve 44 is controlled in its operation by a pair of electro-magnetic coils 46, 48 and has a mode of operation which will be described in detail with reference to FIGURE 2, hereinafter.

The fluid circuit comprises a reservoir or sump 50 which contains fluid 52. The fluid 52 is drawn from sump 50 by a constant pressure delivery pump 54. The pump, which may typically operate in a range of 500–3000 p.s.i., forces the fluid in flow paths indicated by arrows in FIGURES 1 and 3 of the drawings. It will be noted that, downstream of pump 54, is a relief valve 56 operable to assist in effectively maintaining a source of constant pressure fluid. Operating pressure from pump 54 is furnished through conduit 58 to input port 60 of valve 44. Suitable filter elements may be incorporated in the pressure system as required. The pressure system is completed from valve 44 from output ports 61 and 62 through conduits 40 and 42, respectively, which are connected to the respective heads of cylinder 30. Exhaust flow from valve 44 is provided through valve port 63 into conduit 64 which returns the fluid to sump 50. As will be seen from FIGURES 1 and 2, the valve 44 is electrically controlled by the operation of a pair of selectively energized coils 46, 48. The control signals, which are of variable amplitude of signal and polarity at terminal points 66 and 68, originate from a sensing circuit 70 which is utilized to sense the position of the electrode 10 with respect to workpiece 12 as indicated by an electrical characteristic of the gap. The output of the sensing circuit provides a signal to the servo system when downfeed or backup is necessary to maintain optimum gap distance between electrode 10 and workpiece 12. Sensing circuit 70 will be shown and described in FIGURE 5, hereinafter.

FIGURE 2 shows the means utilized in the present invention for applying a balancing pressure at null to maintain piston 32 stationary with the detail of the elements of directional control valve 44 including the pair of electrically energizable coils 46 and 48 which control the operation of valve 44 and the subsequent movement of piston 32 in response to the electrical output of sensing circuit 70 as received at terminals 66 and 68 of FIGURE 1. Coils 46, 48 may be connected in series, parallel, or in "push-pull" relationship, it being necessary only to correctly phase the coils so that the desired direction of operation of piston 32 carrying electrode 10 is obtained with a reversal of polarity across the coils. In the present instance, coils 46, 48 are connected in series. It will be seen that valve 44 incorporates a sensitive first stage and a second stage which is operable in response to operation of the qiuckly acting first stage. A hydraulic amplification is present in valve 44 which causes the relatively low differential pressure developed in its first stage to be amplified in the second stage in such a manner that relatively high pressures are available as required to operate the power feed piston 32.

The first, electrically operated stage of valve 44 is controlled by a flapper 72. Flapper 72 has a central pivotal mounting indicated at point 74 and its positioning is governed by permanent magnet 76 and by the action of coils 46, 48 which add or subtract flux in accordance with their selected energization. An insulating portion of non-magnetic material is indicated by the numerals 75a, b, c, and d which is preferably constructed in one integral part.

FIGURE 2 further shows the second stage of valve 44 including the valve operating means herein embodied as a spool or plunger 78 having lands 80, 82 and 84. Exhaust port 63 has orifices 63a and 63b in correspondence with the lands 80 and 84, which are operative to vary their respective orifice sizes. Inlet port 60 has an orifice 60a in correspondence with central land 82. It will further be seen that a significant mechanical clearance is provided between the land faces and their corresponding ports as indicated by the reference letters A, B, B', and C. Construction of the directional control valve in this manner is known in the hydraulics industry as underlap which is normally regarded as undesirable in valves particularly those requiring distinct "on-off" operation. Sufficient underlap is provided so that substantial deflection of the plunger 78 is required from its central position to produce a net change in output pressure. In the present instance, valve 44 has an underlapped condition of at least 10% so that a corresponding predetermined deflection of plunger 78 is required before full flow of output fluid pressure results. In a central position of plunger 78, fluid flow is through inlet port 60, around land 82, through passage 86, through filters 88, through passages 90 and 92 to fixed restrictions 94 and 96, to nozzles 98 and 100 which are directed toward respective end portions of flapper 72. If we assume that the polarity of terminals 66, 68 as shown in FIGURE 1 is such that downfeed of electrode 10 is called for, coils 46, 48 are energized in such polarity that flapper 72 has a movement toward nozzle 98. Increased pressure is developed in passage 102 through action of restriction 94 and decreased pressure results in passage 104 through the action of restriction 96. The movement of plunger 78 is then initiated in a rightward direction. This subjects port 61 to an increased pressure from inlet port 60 and port 62 is further opened to exhaust port 63 by the movement of land 84. Thus, pressure is substantially increased at port 61 and correspondingly decreased at port 62. This causes a relatively higher force to be exerted against the upper face of piston 32 than against its lower face and to initiate its downward movement. Upon the signalling of electrode retraction or backup from sensing circuit 70, coils 46, 48 are oppositely polarized to provide the opposite movement of flapper 72 causing increased pressure on port 62 and increased exhaust on port 61, whereby an upward movement of piston 32 is initiated.

It will further be seen that two additional paths of fluid flow are present in the central condition of plunger 78 because of the underlapped condition present and the mechanical clearances provided at A, B, B', and C. Flow occurs from inlet port 60 past land 82 and land 84 to exhaust port 63. At the same time, flow occurs past land 82 and land 80 to port 63. Plunger 78 is normally centered by the action of springs 106, 108. A null adjust screw 110 is provided to allow leftward or rightward adjustment of the null position of plunger 78. In the system of FIGURE 1, if the diameter of rod 14 or the weight of holder 16 and electrode 10 requires a net upward force on piston 32 to maintain it stationary at null, screw 110 may be turned in a direction to displace plunger 78 leftwardly. This decreases the clearance provided at B and increases the clearance provided at A and thus produces less pressure on port 61 which is connected to the upper face of piston 32. At the same time, the clearance at B' is increased and that at C is decreased, thereby increasing the pressure applied to port 62 which in turn applied increased pressure to the lower face of piston 32. This adjustment may be made in the absence of an electrical control signal to the servo valve 44 to provide a system balance for mechanical setup. The clearances provided at A, B, B', and C are such that hysteresis, deadband or temperature shift of the valve as well as other conditions tending to cause unbalance are overcome. Otherwise stated, the lands 80, 84 exercise the function of pressure return lands controlling the output of fluid through the pressure return ports terminating in conduit 63. The land 82 exercises the function of a control pressure land which controls the fluid flow through pressure ports 61, 62. In the presence of an electrical control signal to coils 46 and 48, the spring setting of the null condition is overcome and a control output is provided as required to cylinder 30 from output ports 61 and 62. It will be appreciated that the servo system of the present invention may be utilized in connection with piston motors of the double rod type in which a pair of substantially equal cross sectional area rods are employed to equalize the operative face areas of piston 32 or in a number of variations of rod and piston configurations.

The advantage of the use of a two-stage valve in operation of the instant power feed system is believed evident when it is considered that redistribution of fluid pressures from the first valve stage may result in only one or two pounds net differential force on plunger 78. Cylinder 30 may be operated at 1000 p.s.i. or more and have a ram area of 10 square inches or more to generate up to 50,000 pounds of force. To operate plunger 78 directly with sufficient sensitivity would be extremely difficult, while operation of flapper 72 with the relatively small electrical forces available is entirely practical. Thus, a sensitive, quick acting and high power feed mechanism results.

FIGURE 3 shows a further embodiment of the present invention in which four-way valve 44 has been replaced by a three-way directional control valve 44a. Three-way directional control valves are well known in the hydraulic art and may be characterized as having three conduit connections; one from the pressure source, a second to the reservoir or sump, and a third providing a single variable output line to one end of the work cylinder. Valve 44a is also a two stage valve in which the first stage is electrically operable in response to control signals from sensing circuit 70 and is essentially similar to that shown in FIGURE 2 for valve 44. The second stage of valve 44a is substantially similar to that of valve 44 as shown in FIGURE 2 except that one of the outlet ports, for example, port 62, would be blocked to provide three-way operation. In such case, outlet port 61 is alternately connected to pressure inlet port 60 for downfeed or to exhaust port 63 for backup by corresponding displacement of plunger 78 and variance of the clearances at A and B. A similar balancing of the system may be achieved by the proper rotation of adjust screw 110 in the absence of an electrical control signal to the electrical stage of valve 44a. With plunger 78 exactly centered, an equal pressure drop occurs across A and B of the valve and, therefore, the pressure at port 61 is one-half of the system pressure, thereby causing an exact balance of the system. For different ratios of top and bottom piston areas or for different conditions of electrode weight or coolant force, the centering adjustment is made in a manner similar to that of the system of FIGURE 1.

Included in the servo system of FIGURE 3 is an arrangement of a gas accumulator 112 and relief valve 115 which assists in maintaining a constant pressure in the supply conduit 58 to valve 44a. In the three-way operation of valve 44a, a single variable control output is employed through conduit 40 against the upper face of piston 32. This necessitates the employment of a constant upward reference pressure against the lower face of piston 32 which is achieved by the connection of conduit 59 between a point downstream of accumulator 112 and the lower head of cylinder 30. It should be noted that, in a manner similar to that shown in FIGURE 1, a single rod arrangement including rod 15 for the support of electrode 10 is used. Rod 15 in this instance is of larger cross section and for equal advance and retract characteristics may be approximately one-half the area of piston 32.

FIGURE 4 shows a schematic diagram of sensing circuit 70 which provides the electrical control for coils 46 and 48 in the first, electrically operable stage of servo valve 44 or 44a. The electrode 10 and workpiece 12 are connected across an electrical discharge machining power supply of pulsating direct current voltage represented by the terminals 112, 113. The power supply may be of the RC relaxation oscillator type well known in the electrical discharge machining art and adequate to supply requisite voltage for causing discharge across the gap between electrode 10 and workpiece 12 in accordance with the characteristic of the circuit or may be of other more advanced pulser types. A sensing network comprising a resistor 114 and a capacitor 116 is connected across the machining gap. This is a standard sensing network which presents at terminals 118, 120 the average voltage present across the gap. The terminal 118 is connected to the negative side of a reference voltage source 122. The terminal 120 is connected through a rheostat 124 and a pair of double anode reference diodes 125, 127 to valve terminal 68. Rheostat 124 is further shunted by a diode 129. The reference voltage 122 is connected in parallel with a potentiometer 126, a limiting resistor 128 being connected in series. Limiting resistor 128 is included because operation of this circuit at voltages below 20 volts is unsatisfactory in many instances. Valve control coils 46, 48 are connected in series between terminals 68 and 66. Terminal 66 is connected through a rheostat 130 to terminal 132 which is the adjustable voltage terminal of potentiometer 126. Rheostat 130 is further shunted by a diode 131. A rheostat 134 is series connected with a diode 136 across servo coil terminals 66 and 68 and a parallel rheostat diode combination 138, 140 is similarly connected, the diode 140 being of opposite polarity to diode 136. The circuit is completed by capacitor 142 which connects terminal 66 with terminal 118.

In this circuit, a difference in voltage between terminal 120 which is at a potential of the average input voltage at the working gap and terminal 132 which is at a potential of the preset balance reference voltage is presented to the coil network for controlling the electrode position. In actual practice, rheostats 124, 130 and 126 may be ganged together to form the gap reference network.

It will be seen that, in operation, sensing circuit 70 has a performance which is particularly advantageous and developed especially for use in this type of servo system in that there is provided a deadband or range of "no operation" about the reference voltage setting. By reason of the inclusion of one or more double anode reference diodes 125, 127 the problem of minute voltage unbalances between the sensing network and the reference network is eliminated. A difference equal to the amount of regulating voltage of the double anode reference diodes must exist between the sensing and reference networks before any operative voltage is supplied to the servo coils 46, 48. As an example, if the regulating voltage of diode 127 is two volts and that of diode 125 is ten volts, a net difference of at least 12 volts must exist between the voltage at points 120 and 132 before any electrical control signal is applied to the servo coils. This means that in the example given, in order to cause downfeed, the gap voltage must increase above the reference voltage by 12 volts in order to produce a downfeed signal and, oppositely, it must drop 12 volts below the reference voltage in order for a backup signal to be applied. This eliminates the continual hunting variance of the servo system during a normally acceptable gap voltage condition. Gap voltage provides the ideal characteristic to be sensed because the changes in gap voltage over a relatively wide range result in no loss in efficiency. A servo system maintaining gap voltage within this "dead center" range provides a mode of operation distinctly different from that utilized in known prior art systems. With this improved system, continuous hunting of the system about the reference voltage is eliminated and it is possible for the electrode 10 to move in the smallest discrete steps that can be achieved by the system. This method of operation is particularly important at the low feed rates of .001 inch per minute or less since continuous feed at the rate of advance is virtually impossible.

With further reference to the FIGURE 4, it may be seen that rheostat 138 and diode 140 determine the level of excitation of coils 46, 48 and the velocity of the downfeed of the electrode. Similarly, rheostat 134 and diode 136 provide the backup velocity control. The incorporation in the circuit of capacitor 142 additionally serves to act as a factor in eliminating over-travel of electrode 10, particularly when it is advancing downwardly. Capacitor 142 also serves to stabilize the performance of the circuit provided that the RC time constant is not less than approximately 20 times that of the mechanical time constant of the machine. During backup of the electrode 10, diode 131 shorts out rheostat 130 and terminal 66 and capacitor 142 remain at the potential of point 132, thus allowing quick recovery after a short circuit condition at the gap.

The control circuit of FIGURE 4 is adapted to be used with a sensing network which responds to peak gap voltage or gap striking voltage. By the substitution of a diode for resistor 114, it will be seen that capacitor 116 will store gap striking voltage, which level will be reflected at point 120. By "striking voltage" is meant that gap peak voltage that exists for sufficient time just prior to each gap discharge to breakdown and ionize the dielectric filled gap thereby causing the discharge. The time required for the dielectric breakdown is somewhat dependent upon the magnitude of voltage for a particular gap but is in the order of a microsecond. Transient voltages of much higher voltage and much shorter duration may exist across the gap without causing breakdown and are thus not included.

FIGURE 5 illustrates an alternate embodiment of the present invention in which a hydraulic fluid motor 144 of the rotary actuator type is coupled in the system of FIGURE 1 to drive a mechanical gear train to effect the positioning of electrode 10. Fluid motor 144 has connected to its output shaft 146 a spur gear 148. Spur gear 148 meshes with gear 150 which is rigidly secured to the upper end of lead screw 152. Gear 150 may be of a split type construction and spring preloaded to eliminate backlash between it and spur gear 148. Lead screw 152 is connected to a ram 154 by threadably engaging a spring loaded ball-nut assembly 156. Thrust bearing 158 is utilized to permit rotation of lead screw 152 when it is driven by the rotation of gear 150. Rotation of lead screw 152 through its threaded engagement with nut assembly 156 causes ram 154 to advance or retract the electrode 10 in accordance with the direction of rotation of lead screw 152. The rotation and lateral displacement of ram 154 is prevented by proper adjustment of gibs 160 and 162 which in turn are attached to the rigid portion of machine column 164.

FIGURE 6 shows a hydraulic motor 144 of the rotary type as connected in a balanced servo system of the type hereinbefore illustrated in FIGURE 5. Control fluid flow from conduits 40 and 42 is directed in the manner illustrated to provide reversible action of motor 144. Motor 144 is shown with its end plate removed and comprises a body 166 having an internal cam ring 168, a rotor 170 and a plurality of laterally disposed vanes 172 mounted on rotor 170. It will be seen that each pair of vanes, as for example 172a and 172b, are mounted in a complementary fashion at 90° displacement from each other on rockers 174 which in turn are pivotally supported and preloaded at each end of rotor 170 to provide an outward force on the vanes tending to extend them into engagement with the outline of cam ring 168. Thus, as each vane is being pushed in by cam ring 168, its complementary vane is being pushed outwardly by their common rocker 174. The direction of rotation of the rotor 170 and, consequently, the output shaft 146 is dependent upon the relative pressures exerted through conduits 40 and 42 and the reversible inlet-outlet ports of motor 144.

FIGURE 7 shows a pair of friction shoes 176, 178 which may be utilized in the servo feed systems of FIGURES 1, 3, and 5 for selectively adjusting the static friction in the system. It has been found that operation of such servo systems may be greatly improved by the incorporation of means for predetermining the static friction of the system. It has further been found that, for best operation, the static friction force present should be equal to 5% or more of the maximum force available in either direction from the piston. For this purpose, friction shoes 176, 178 are mounted on a vertical machine column 180 and extend forwardly therefrom and into engagement with the piston rod 14 or other suitable portions of the electrode bearing mechanism. Friction shoes 176, 178, further, are spring biased into engagement with diametrically opposite portions of rod 14 by the action of springs 182 and 184, respectively. Adjusting screws 186 and 188 are provided for selectively varying the spring pressure and, hence, the static friction effective on the rod 14. It will be noted that the structure of FIGURE 7 has a similar purpose to the gear train mechanism shown in FIGURE 5 namely that of stabilizing the electrode feed mechanism against disturbing forces such as that exerted by coolant pressure in the axial direction or of weight of the electrode and supporting structure. Friction shoes 176, 178 may be utilized to advantage in the system of FIGURE 5 when required, depending on the preloading and the inherent friction present in the gear train.

*Description of operation*

With reference to FIGURES 1 and 2, it will be seen that the downfeed and backup of electrode 10 is controlled by electrical signals representative of gap spacing received by the first or electrical stage of directional control valve 44. Where machining conditions are at an optimum at an exceedingly close gap spacing of electrode 10 and workpiece 12, it will be seen that a constant hunting i.e. upward and downward movement of the electrode may result without the advantages of the present invention. The objections mentioned above in a standard hydraulic system are such that stability of the machining operation is impaired. Overrun in a downward direction can cause the electrode 10 to strike the workpiece 12 and result in damage to both. Use of mechanical biasing means such as, for example, centering springs in conjunction with piston 32 does not present a solution to this problem because of their non-linearity of flexure, proneness to fatigue and other like factors. To provide for establishing a null position of the piston 32, a more reliable prebiasing force system is required. This has been accomplished through the expedient of providing selectively preset opposing fluid forces to the motive element of the fluid motor, that is, to the faces of piston 32 through means integral with the valve operating means through the modification shown of servo valve 44. As shown and described in connection with FIGURE 2, the balancing pressures exerted through output ports 61 and 62 are readily predetermined by the setting of screw 110 to adjust the relative sizes of clearances A, B, B′, and C. It will further be seen that sufficient clearance is provided so that a substantial deflection of the valve plunger 78 is required from its center position to produce a significant change in output pressure. Otherwise stated, port orifices 63a, 60a, and 63b are substantially underlapped by the operative faces of lands 80, 82, and 84, respectively. For best results, I have found that 10% or more underlap condition with corresponding deflection of the plunger 78 should be required to seal off or open the respective ports. As related to the piston 32, I have found that the most stable balancing of the servo system is achieved when, in addition, the static friction level of the system is at least 5% of the maximum force available from the piston in either direction and preferably within the 5% to 10% range. The balancing system can thus be preset to compensate for variations in the system arising from such factors as different levels of inherent static friction operating on the piston, changes in weight of electrode or supporting structure, shift of null point of valve 44 due to temperature changes or other factors, and variance in coolant force which may result from varying pressure or effective area and may exert appreciable upward and disturbing forces on the piston. It should be further noted that the operative faces of piston 32 differ in area because of rod 14 and this requires the application of opposite and different forces through conduits 40 and 42 to achieve a properly balanced stationary position of the piston. By selective change of the balancing forces applied to piston 32, it is possible to permit its initial movement at any desired position at or near null of valve 44. In other words, the present invention provides a ready and positive means for predetermining the null characteristics of the system.

One of the most important advantages afforded by the present invention is that the electrode or ram may be maintained in an absolutely stationary or fixed position during electrode setup. As described above, it is necessary to make mechanical measurements and adjustments during the mounting of the electrode and prior to machining. Present systems employ elaborate balancing mechanisms or provide ram locks and pressure interlocks with the hydraulic system in an effort to maintain the electrode in a fixed position during setup. These provisions have been found to be ineffective, frequently contributing to loss of accuracy, and, because of the inherent characteristics of the valve and the system itself, are subject to continual change. In other words, a preset balancing system may provide momentary balance of the ram only to have it disturbed by a slight change in temperature or by contamination of components in the hydraulic servo system.

FIGURE 3 illustrates an additional embodiment of the present invention in which a single rod 15 is employed which is of relatively large diameter as compared to rod 14 of FIGURE 1. The use of a three-way directional control valve 44a in place of four-way directional control valve provides a single, variable output to control the movement of piston 32. A force balancing system is provided through conduit 40 to apply a variable balancing force to the upper face of piston 32 in opposition to a constant upward force exerted on the lower face of piston 32 through conduit 59. With reference to FIGURE 2, the selective presetting of valve plunger 78 and the location of its lands relative to their corresponding overlapping valve ports determines the magnitude of the balancing force to the piston. By the simple manipulation of adjusting screw 110, the proper relationship of clearances is achieved to provide a constant flow of fluid to provide a stationary positioning of piston and electrode, in the absence of an electrical control signal to the directional control valve 44a.

By reason of the mode of operation previously discussed for the circuit of FIGURE 4, it will be seen that the electro-hydraulic servo system of the present invention is electrically controlled in such a manner that the electrical circuit is stabilized with respect to the electrical control signal provided to the first stage of directional control valve 44 or 44a in the systems of FIGURES 1, 3, and 5. This is accomplished, as has been emphasized, through the establishing of a null "dead center" voltage range of operation by reason of the inclusion of double anode reference diodes 125, 127 in the circuit of FIGURE 4.

The alternate embodiment as shown in FIGURES 5 and 6 provides a servo system which is balanced exactly on null because of the action of a directional control valve constructed in accordance with the teaching of the present invention. By reason of the mechanical coupling provided in FIGURE 5, a change in downward force of the electrode assembly or in the upward force tend to produce a self-locking condition of lead screw 152. Otherwise stated, it is impossible to drive screw 152 except by the action of servo motor 144 and the disturbing forces exerted in the axial direction of lead screw 152 are not effective to upset a predetermined balance. Such a system has obvious disadvantages in that the mechanical rigidity of the system attained is at the sacrifice of sensitivity of operation which may be exceedingly deleterious with the critical and close gap spacings required. A most satisfactory compromise has been achieved by the incorporation in the servo system of a selectively predetermined friction applying means of the type shown and described in connection with FIGURE 7. In practice, I have found that utilization of friction shoes or like means which apply a controlled friction force to the motive element of the fluid motor through the rod, ram, output shaft, or other associated mechanism results in a most stable operation of the system when the friction force applied is equal to at least 5% of the maximum force available from the motive element.

The operation of the electro-hydraulic servo system is at an optimum when, in accordance with the present invention, a balancing force system is provided by the directional control valve as appropriately modified, a mechanical stabilizing means of the friction varying type is utilized, and the electrical energization of the directional control valve is controlled outside the limits of a predetermined voltage range of null operation.

It will thus be seen that, by the present invention, I have provided an improved fluid actuator system of particular value when incorporated in a servo feed system for electrical discharge machining. While the principles of my invention have been embodied in electrical machining apparatus by way of illustration, it will be seen that my invention is equally applicable to any fluid actuated, servo feed system.

I claim:
1. A fluid actuator system comprising a fluid motor having a motive element differentially positionable in response to operating fluid flow, an electrically energized directional control valve for controlling the positioning of said element, a pressure port of said valve for providing an operating fluid flow to said element, a pressure return port of said valve, and a valve operating means operable in the unenergized condition of said valve to provide through its pressure port a balancing pressure to said motive element to maintain it in a stationary position, said valve operating means including a pair of underlapped, port varying lands, each juxtaposed to a different one of said ports and controlling fluid flow therethrough, each of said lands underlapped relative to its associated port by at least 10%.

2. The combination as set forth in claim 1 wherein a means is operatively connected to said element to provide a predetermined static friction force to control its movement.

3. In an electrical machining apparatus having an electrode adapted to be maintained in constant selected gap relationship with a workpiece, a servo feed system comprising a hydraulic cylinder, a piston differentially positionable therein, a rod extending from at least one face of said piston and operatively connected to provide relative movement between said electrode and workpiece, an electrically energized directional control valve of the four-way type having a pair of pressure ports, each operatively connected to provide a control fluid flow to a different face of said piston, and a pair of pressure return ports, means for applying balancing pressures to both faces of said piston in the unenergized condition of said valve comprising a valve operating plunger having a plurality of underlapped, port varying lands, each juxtaposed to and controlling fluid flow through at least one of said ports, each of said lands underlapped relative to its associated port by at least 10%, means for adjusting the position of said plunger and its lands relative to said ports for inversely varying the balancing pressures to said piston, and means operatively connected to said piston to provide a predetermined static friction force to control the movement of said piston.

4. The combination as set forth in claim 3 in which said lands have an underlap of at least 10% and said last-mentioned means is operable to provide a static friction force equal to at least 5% of the maximum force available from said piston.

5. In an electrical discharge machining apparatus having an electrode adapted to be maintained in constant selected gap relationship with a workpiece, an electrohydraulic servo feed system comprising a hydraulic motor having reversible inlet-outlet ports and including a motive element differentially movable in response to variances in operating fluid therethrough, an output means of said motor connected to said element and operable to provide a relative movement between said electrode and workpiece, a network for sensing an electrical characteristic of the gap and providing an electrical control signal, an electrically energized directional control valve connected to said sensing network and operable to provide fluid flow to said motive element including a pressure port of said valve for providing a control output to said motor, a pressure return port of said valve, and a valve operating means operable in the absence of an electrical control signal from said sensing network to said valve to provide through said pressure port a balancing output pressure to said motive element to maintain it in a stationary position, said valve operating means including a pair of underlapped, port varying lands, each juxtaposed to a different one of said ports and controlling fluid flow therethrough, each of said lands underlapped relative to its associated port by at least 10%.

6. In an electrical discharge machining apparatus having an electrode adapted to be maintained in constant selected gap relationship with a workpiece, a servo feed system comprising a hydraulic motor including a motive means differentially positionable in response to operating fluid flow and operatively connected to provide relative movement between said electrode and workpiece, an electrically energized directional control valve of the four-way type having a pair of pressure ports operatively connected to provide a control fluid flow to control the movement of said motive means and a pair of pressure return ports, means for applying balancing pressures to said motive means in the unenergized condition of said valve comprising a valve operating plunger having a plurality of underlapped, port varying lands, each juxtaposed to at least one of said ports and controlling fluid flow therethrough, each of said lands underlapped relative to its associated port by at least 10%, means for adjusting the position of said plunger and its lands relative to said ports for inversely varying the balancing pressures to said motive means, and means operatively connected to said motive means to provide a predetermined static friction force to control the movement of said piston.

7. A fluid actuator system comprising a fluid motor of the rotary type, an electrically energized directional control valve of the four-way type having a pair of output ports operatively connected to provide a control fluid flow to said motor and a pair of pressure return ports, means for applying balancing pressures to said motor in the unenergized condition of said valve comprising a valve operating plunger having a plurality of underlapped, port varying lands, each juxtaposed to at least one of said ports and controlling fluid flow therethrough, each of said lands underlapped relative to its associated port by at least 10%, means for adjusting the position of said plunger and its lands relative to said ports for inversely varying the balancing pressures to said motor, and means operatively connected to said motor to provide a predetermined static friction force to control its movement.

References Cited by the Examiner
UNITED STATES PATENTS

| | | | |
|---|---|---|---|
| Re. 25,580 | 5/1964 | Webb | 314—61 |
| 2,258,007 | 10/1941 | Gonderman | 188—83 X |
| 2,882,437 | 4/1959 | McKechnie | 314—61 |
| 2,903,555 | 9/1959 | Porterfield | 219—69 |
| 2,921,107 | 1/1960 | Toothman et al. | 314—61 X |
| 2,923,973 | 2/1960 | Ninneman | 100—48 X |
| 2,984,761 | 5/1961 | Webb | 219—69 X |

JOHN H. MACK, *Primary Examiner.*

MURRAY TILLMAN, *Examiner.*

A. B. CURTIS, W. VAN SISE, *Assistant Examiners.*